United States Patent [19]
Wright

[11] Patent Number: 5,846,815
[45] Date of Patent: Dec. 8, 1998

[54] CONTINUOUS COMPOSTER HAVING SELF CONTAINED AERATING ZONES

[76] Inventor: James Wright, 511 Woodland Acres Crescent R.R. #2, Maple, Ontario, Canada, L6A 1G2

[21] Appl. No.: 855,480

[22] Filed: May 13, 1997

[51] Int. Cl.⁶ ..................................................... C12M 3/00
[52] U.S. Cl. ..................................... 435/290.4; 435/290.1
[58] Field of Search ............................. 435/290.1, 290.2, 435/290.3, 290.4

[56] References Cited

U.S. PATENT DOCUMENTS

| | | | |
|---|---|---|---|
| 1,545,185 | 7/1925 | Hancock . | |
| 4,326,874 | 4/1982 | Burklin | 422/184 |
| 5,023,178 | 6/1991 | Schiene et al. | 435/170 |
| 5,049,486 | 9/1991 | Blackwood et al. | 435/3 |
| 5,204,263 | 4/1993 | Finn | 435/315 |
| 5,206,263 | 4/1993 | Finn | 435/313 |
| 5,409,831 | 4/1995 | Wright | 435/287 |
| 5,551,969 | 9/1996 | Wright | 71/9 |
| 5,583,045 | 12/1996 | Finn | 435/290.1 |

FOREIGN PATENT DOCUMENTS

| | | | |
|---|---|---|---|
| 0056202 | 10/1981 | European Pat. Off. | C12M 1/00 |
| 0145874 | 6/1985 | European Pat. Off. | C05F 9/02 |
| 57-209895 | 12/1982 | Japan | C05F 9/02 |
| 59-50089 | 3/1984 | Japan | C05F 3/06 |
| 8202737 | 2/1984 | Netherlands | C02F 2/04 |
| 197701 | 1/1977 | U.S.S.R. | C12B 1/10 |

*Primary Examiner*—David A. Redding
*Attorney, Agent, or Firm*—Jane Parsons

[57] ABSTRACT

A continuous composter is provided with self contained aeration zones so that air circulation is confined to any one zone to avoid transmission of bacteria through a composting tunnel. An inlet fan and an exhaust fan are provided for each zone and suction through the exhaust fan is provide stronger than inlet pressure so that gases do not percolate through the tunnel. Similarly water and leachate are removed from the system without contact with downstream composting garbage. Any recirculation of gas or leachate takes place only in the zone from which it has come.

12 Claims, 5 Drawing Sheets

CONTINUOUS COMPOSTER HAVING SELF CONTAINED AERATING ZONES

BACKGROUND OF THE INVENTION

1. Field of the Invention

This invention relates to apparatus for and a method of composting garbage.

2. Acknowledgement of Prior Art

At least since environmental considerations have drawn attention to the undesirability of disposing of garbage as landfill, composting has increased in importance. Various industrial and small scale composting systems have been developed to take the place of the traditional back-yard compost heap.

Proposals have been made for continuous composting apparatus into which garbage is loaded at one end and from which compost emerges at another end. Such apparatus, especially large scale apparatus, has met with problems in advancing the garbage through the apparatus.

An example of such apparatus comprises a tunnel having a feed hopper above one end and an exit at the other end. At the feed end a ram is used at intervals to force the composting garbage through the tunnel over a stationary floor. The ram has a tendency to pack the garbage and thus inhibit aeration, which is necessary for successful composting.

Another system of composting which does allow for the necessary aeration involves pulling composting garbage through a tunnel by means of a net. This system, however, is a batch system and it is necessary to complete one batch of compost before starting another.

Frequently, in known composting systems, stench creates a problem. It is not considered desirable for health or aesthetic reasons to use open composting systems since the smells of rotting garbage may give rise to health problems as well as being unpleasant.

Removal and recycling of noxious gases has also provided problems in the past. Tunnel composters such as that described above merely vent the issuing gases.

More recently, U.S. Pat. Nos. 5,409,831 and 5,551,969 were granted on 5,409,831 and 5,551,969 respectively to James Wright for a continuous composting system. The system of those U.S. patents includes an enclosed composting tunnel inhibiting the escape of noxious gases. Garbage is loaded onto an upstream perforate tray of a train of trays in the tunnel. The trays are moved stepwise through the tunnel, each step being initiated when the upstream tray is fully loaded and is replaced by a new empty upstream tray. Composting takes place continuously in the tunnel and water and air are added as necessary and mixing takes place at least at one point along the tunnel. Such a system has various advantages over previous systems in that exhaust gases and liquids may be removed, and filtered before return to the atmosphere. During the composting the temperature rises to values suitable for composting which may be sufficiently high to kill any bacteria present. However, in some zones of the composter temperatures are lower and there may be a risk that bacteria may be transferred through the composter by means of, for example, air or liquids through the composting material.

Since the eventual composter may be intended for free use by unprotected individuals, it is desirable that it is sterile and safe to use. Since the garbage feed for commercial composters may be of unknown or bacterially contaminated origin, it is important that destruction of bacteria should be complete.

The compost emanating from existing composters, even those such as described in U.S. Pat. Nos. 5,409,831 and 5,551,969 previously referred to, may not satisfy these criteria.

The present applicant has addressed the problem of providing a continuous composting system suitable for large or small scale composting of food garbage with or without the addition of other less easily compostable materials such as wood chips or even rubber. In particular, he has addressed the problem of providing a system whereby bacteria contamination is minimized.

SUMMARY OF THE INVENTION

According to the invention there is provided a continuous composter comprising: an enclosed elongate tunnel having a first upstream end and a second downstream end; an inlet for garbage in the region of the first end; an outlet for compost in the second end; the composter comprising at least an upstream composting zone in the region of the first end of the tunnel, and a downstream composting zone in the region of the second end of the tunnel, the first composting zone and the second composting zone; first self contained means to aerate the upstream composting zone and to recirculate a portion of venting aerating gases within said upstream zone; and second self contained means to aerate the downstream composting zone and to recirculate a portion of venting aerating gases within said downstream zone.

There may be one or more further composting zones, each having self contained aerating means. The upstream and downstream zones may be separated by intermediate zones, blending with the upstream and downstream zones but tending to minimize any interchange of air between the zones.

A portion of the exhaust gases and spent aeration gases may be recycled within each self contained aeration system. Such recycling may provide a suitable treatment for the unpleasant smelling gases. The proportions of recycled gas and fresh air may be maintained by computer. It is important however that recycling is confined in any one composting zone.

The composter may preferably be of the type described and claimed in U.S. Pat. No. 5,409,831 and U.S. Pat. No. 5,551,969. For example, the composter may include a conveyor track raised from a floor of the tunnel and extending along the length of the tunnel; a train of conveyor trays to travel shuntwise on the conveyor track, each tray having a shunting frame to receive directional shunting force and each tray having a foraminous carrier surface to allow aeration of material in the tray; a ram having a stroke in the direction of an elongate axis of the tunnel, the length of the stroke being equal to a chosen length of shunting step of the conveyor trays, the ram being located to act against the shunting frame of the conveyor tray which is furthest upstream. Blending means are provided at the first upstream end of the composter. The blending means comprises a trough comprising an elongate section of a cylinder having an open mouth, a elongate base convex to an outer surface of the trough, the trough being located across the top surface of the tunnel below the inlet for garbage and being tiltable about an elongate axis of the trough between a first position in which the open mouth faces upwardly for reception of garbage into the trough for retention thereon, and a second position in which the open mouth faces downwardly to empty garbage from the trough into the inlet for garbage, the trough having blending augers for blending garbage in the trough.

The trough may be tiltable by means of gear teeth on an outside surface of the trough engaging with complementary gear teeth of drive means therefor.

The blending augers may be driven in opposite directions to mix intimately garbage that is present in the trough. A lid may be provided to close the open top of the trough when it faces upwardly to confine the smell of garbage within the trough. The lid is openable to allow supply of garbage to the trough pivots to empty garbage into its inlet of the tunnel. If the lid is freely hinged at one edge, pivoting of the trough may raise the lid automatically.

The tunnel may have generally parallel sidewalls and the conveyor track may comprise a pair of rails.

The conveyor trays may be generally rectangular in shape, and have a width between the shunting wall and an opposed wall equal to length of the ram stroke. Conveniently, the conveyor trays are provided with slide runners to bear on the conveyor track. Alternatively the rails may have slide surfaces on which the trays may slide. It is, however, more convenient to provide these surfaces on the trays since they are more easily inspected for wear. The base of the conveyor trays may be perforated metal sheet or mesh or other foraminous material.

The tunnel outlet may be provided with closure means openable by pressure of an advancing conveyor tray such as a freely hinged door. Mixing means may be provided in the tunnel for mixing composting garbage. Such mixing means may comprise mixing rollers extending from side to side of the tunnel and having, for example, paddles for mixing the garbage. Conveniently the mixing means are provided in an intermediate zone separating the first and second composting zones, or in regions of high temperature whereby there is little risk of bacteria from one zone contaminating a downstream zone. The paddles may be angled to one side or the other of the tunnel to encourage cross mixing of garbage. At any one location two mixing rollers may be provided, one above the other. Each mixing roller may have at least one first paddle having a helical orientation on the roller so as to direct the garbage in one direction and at least one second paddle having an opposite helical orientation to direct garbage in an opposite direction. Preferably, adjacent paddles may have helical twists in opposing directions to direct the garbage in opposing directions with a view to mixing garbage in the transverse direction of the tunnel. Alternatively, each paddle may be an upstanding flap having its plane at right angles to the axis of the roller, a number of flaps being arranged about the roller spaced from one another to form a number of shallow helical bands. Each roller may have at least one first band with a helical orientation to one hand and at least one second band with a helical orientation to the other hand.

Immediately downstream of the mixing rollers, before the garbage has had time to settle and compact, water may be added to the garbage in an amount to promote composting. At least one water spray pipe may extend across an upper region of the tunnel to spray water in a descending water curtain. Very preferably at least two such pipes for the provision of two water curtains are provided close to one another. The spacing between the pipes may be in the general range of from 9 inches to 12 inches. Of course, it will be appreciated that in a smaller composter the water spray pipes will tend to be closer together. The leachate may be collected in separate self contained drain boxes for each zone and recirculated only into the zone from which it has come.

The invention also includes a method of composting comprising depositing garbage into a composting tunnel through an inlet; in the region of a first end; removing compost from an outlet at a second end of the tunnel; and aerating upstream and downstream zones of the composter separately and recirculating a portion of spent aerating gas only into the zone from which it has come.

BRIEF DESCRIPTION OF THE DRAWINGS

Embodiments of the invention will now be described by way of example with reference to the drawings, in which.

DETAILED DESCRIPTION OF THE DRAWINGS

Figure 1:
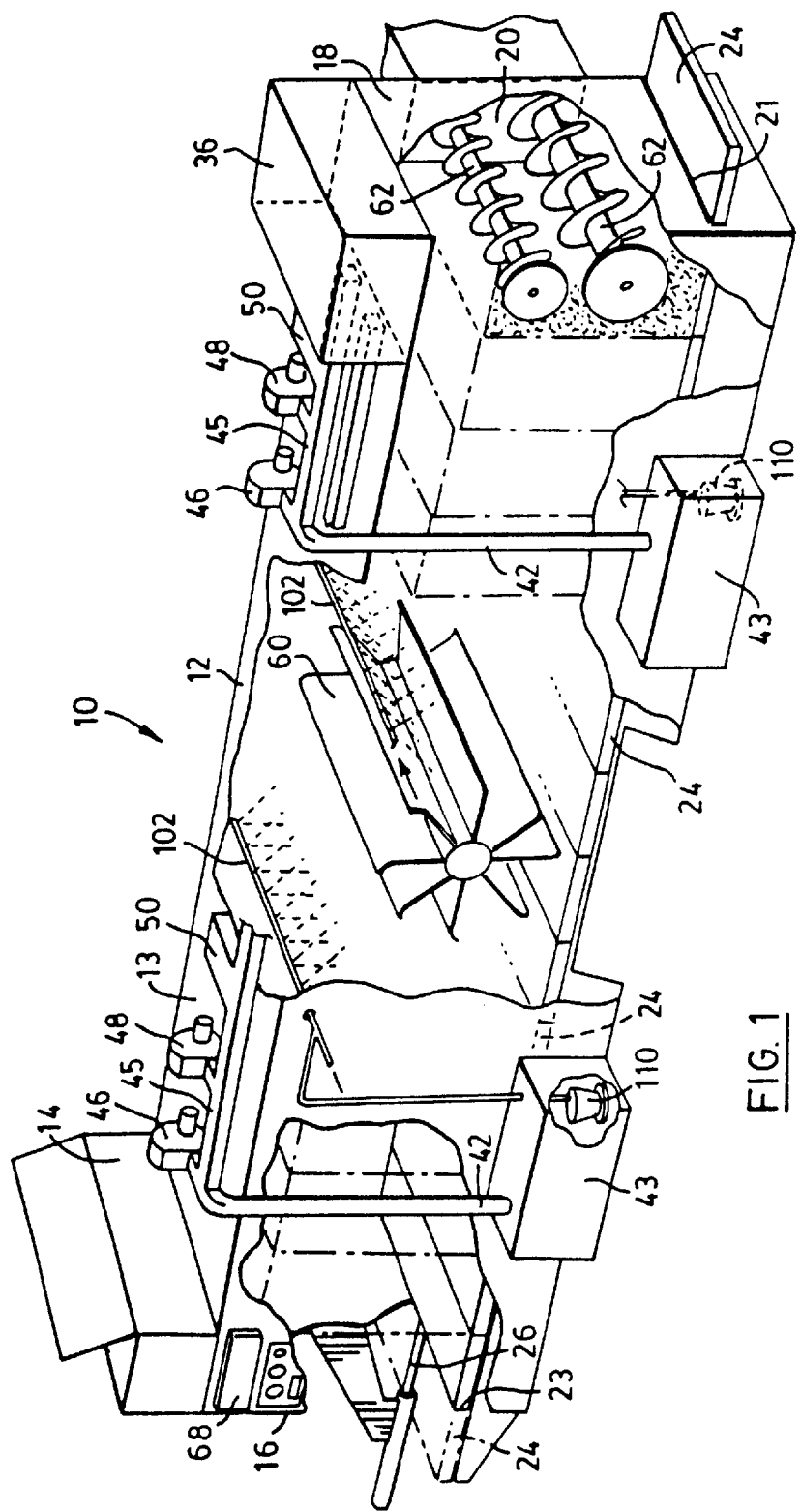
FIG. 1 is a schematic illustration of a composter according to the invention from one side.

The drawings illustrate a composter 10 comprising a tunnel 12 having a top 13 and a blending hopper trough 14 in an upstream end 16 of top 13. The blending hopper trough 14 is normally sealed closed to prevent the escape of noxious gases. A conveyor lifts garbage to deliver it to the blending hopper trough 14. The downstream end 18 of tunnel 12 has a doorway 20 for outputting compost. The doorway is normally sealed closed. Within the tunnel 12, tracks 22 are provided to each side of the tunnel supporting conveyor trays 24. The conveyor trays 24 move stepwise through the tunnel in a longitudinal direction on the conveyor tracks.

An upstream conveyor tray 24 is located on the tracks 22 underneath the blending hopper trough 14. Garbage is added from the conveyor, to the blending hopper trough 14 from which it is delivered to a suitable depth in tray 24, say within a foot of the roof of tunnel 12. The tray 24 is then stepped forward by action of a ram 26 having a stroke sufficient to move tray 24 forward sufficiently to allow space for a further tray 24. Ram 26 is then withdrawn and another tray 24 is inserted between the ram and the now filled tray 24. The number of trays and the length of the tunnel may be such that composting is complete when a tray 24 reaches end 18 of the tunnel. The compost may then be removed from the tray by a conveyor and the tray may be returned to the input end 16. Tray return may be manual or may be automated. When tray return is automated, each tray exiting from a tray exit port 21 may be ejected onto a conveyor to return the tray to a tray entry port 23.

Conveniently, the size of the tunnel and the size of the trays may be such that each tray may take a day's supply of garbage. It is suggested that under good conditions of composting fourteen days will be sufficient to make compost and thus the line of conveyor trays within the composter may be fourteen as shown. The operation of the composter will be described in greater detail with reference to the apparatus parts hereinafter.

The compost loaded into trough 14 may be food garbage which is preferably blended with bulking materials such as newspaper or wood chips. Rubber crumb may be blended with food garbage and is subjected to the composting process. This may be a useful way of disposing of rubber waste which currently causes considerable problems. Rubber crumb having a particle size between ¼ and ¾ inch may be used in proportions of up to ⅓ by volume or even more of food garbage.

Each conveyor tray 24 comprises a frame and foraminous surface 28 through which air can access the garbage to be composted. The foraminous surface 28 is located above the frame. Trays are added to the train or trays at the upstream end of the tunnel 12 through a tray entry port 23. Tray 24, which is acted upon by ram 26 to advance a step within the tunnel, acts on the tray 24 downstream of it to advance that tray 24. Thus the trays are shunted down the tunnel until the last tray 24 is shunted out of tray exit port 21 which may, except during exit of a tray, be sealed against the escape of gases. Since the trays are subject to considerable stresses, initially imparted from ram 26 against the frames, these frames are built to withstand these stresses. Frame sidewall 30 is of sufficient height to be impacted by the front face of ram 26. Ram 26 conveniently accesses the most upstream frame through tray entry port 23. In practice, it is not necessary that walls 30 should be very high. It is only necessary that they have a vertical area to accommodate the driving face of ram 26 so as to absorb its whole force.

The other pair of tray sidewalls located longitudinally in the tunnel are conveniently made as sturdily as sidewalls 30. However, these longitudinal walls do not have to absorb the full force of the ram against their planes.

The opposed pair of longitudinal tray sidewalls run on tracks 22 carried by the walls of tunnel 12. Conveniently the tracks 22 each comprise a U-section channel, the web 35 of which is attached to the respective tunnel wall 32. The web 35 of track 22 is wide enough that the whole height of tray may be accommodated within the U-section while resting on carrier U-leg 37a and covered by cover U-leg 37b.

The tunnel 12 and the trays 24 may be sized according to the amount of garbage to be handled. Given that, under good conditions, composting may be achieved within fourteen days, it is convenient to provide one tray per day in the composter. Thus, if 200 pounds of garbage is to be handled per day, the tray size and tunnel size should be such that one tray will accept 200 pounds of garbage. The ram size and ram pressure must clearly also be suitably adjusted to moving the entire train of trays within the tunnel. It is, however, emphasized that a composter according to the invention may be designed for a very small domestic operation or for a very large industrial operation. The mechanics and engineering of tunnels and trays of suitable sizing are well within the scope of a man skilled in the art.

Figure 2:
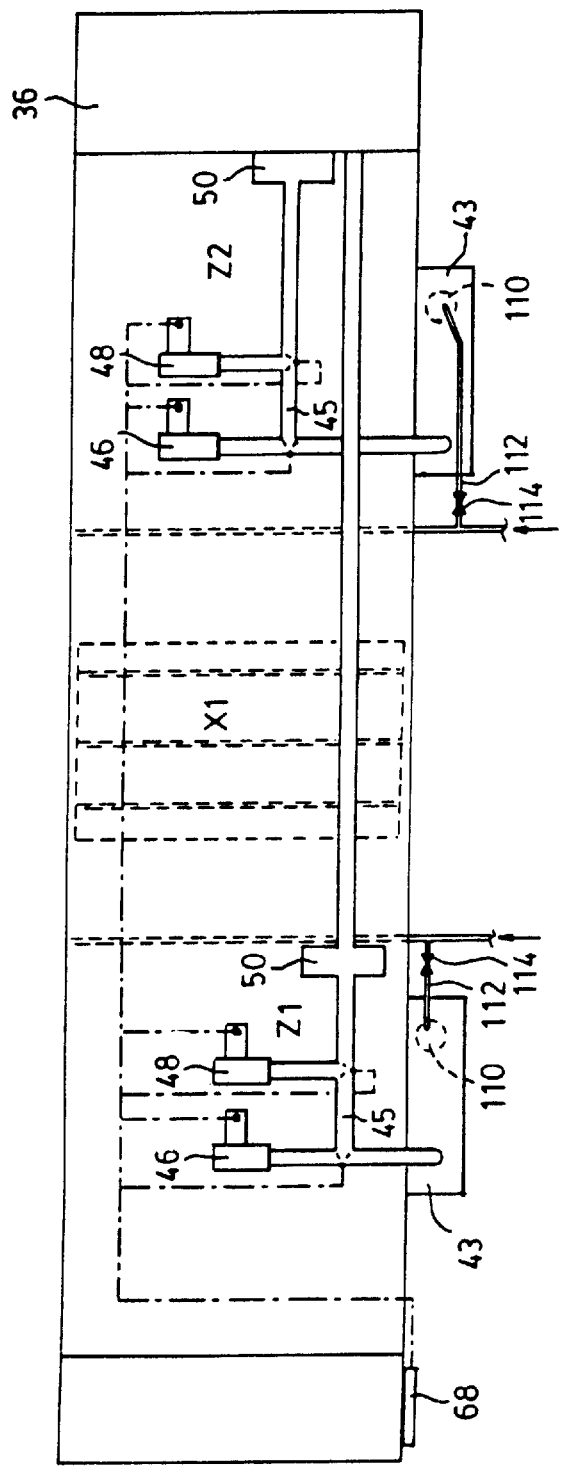
FIG. 2 is a view from above showing the system of water and air delivery.
Figure 3:
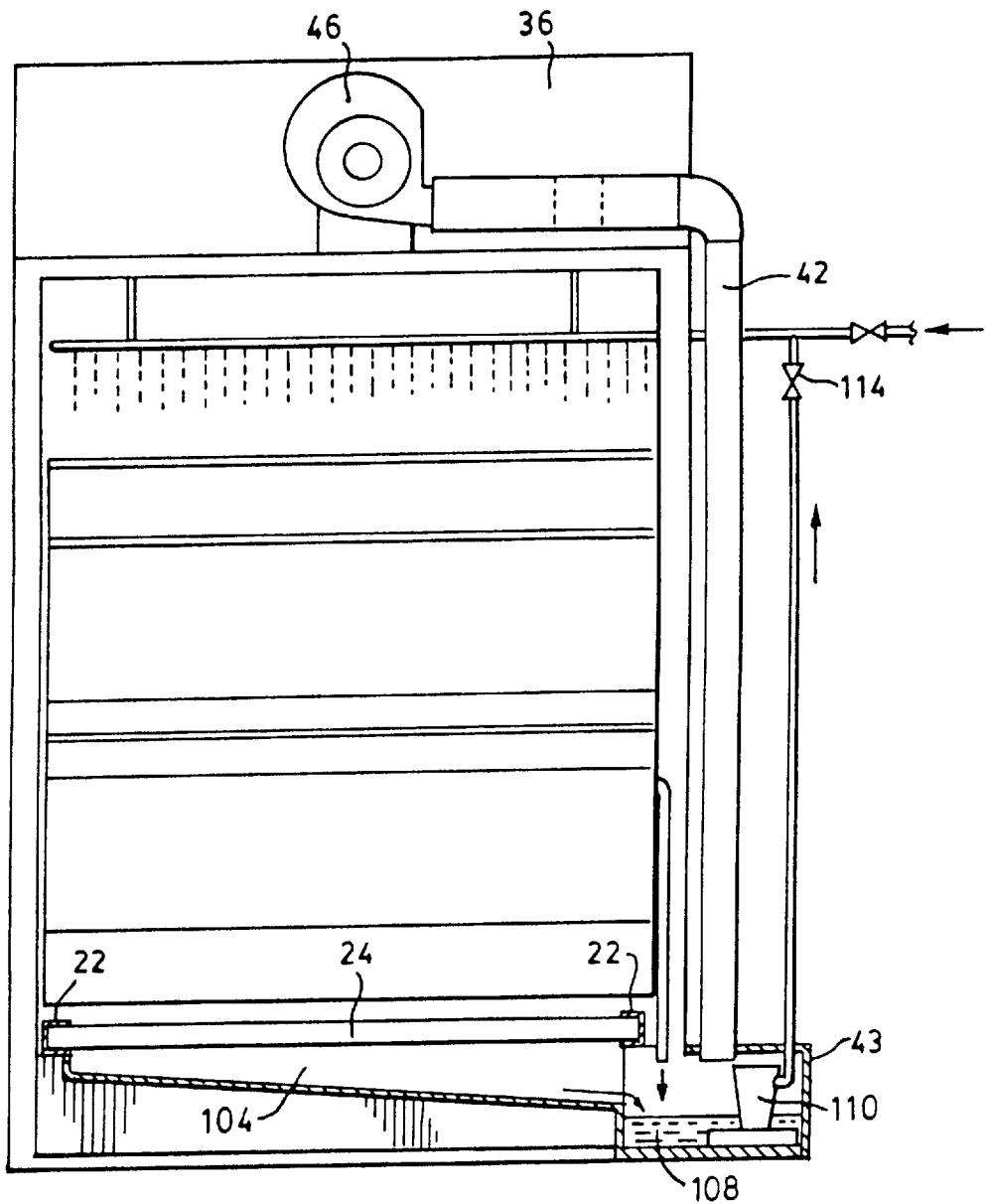
FIG. 3 is a schematic view through the composter of FIG. 1 from an end.
Figure 4:
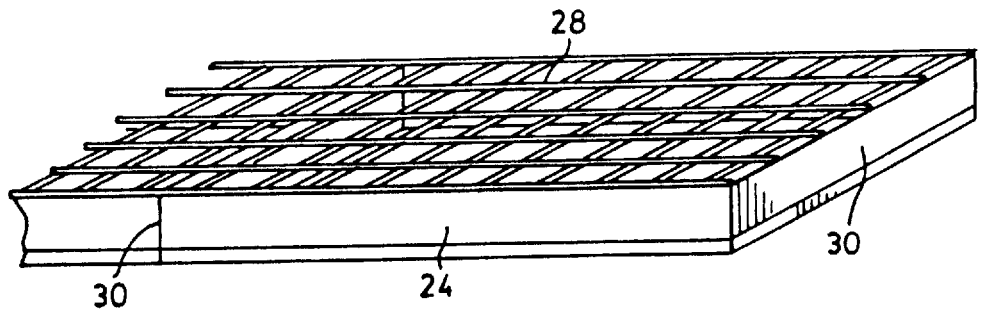
FIG. 4 is an illustration of a movable tray utilizable in a composter such as that of FIG. 1.
Figure 5:
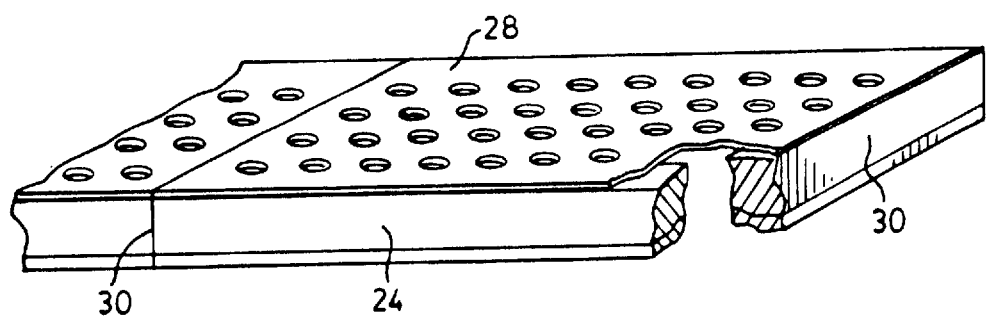
FIG. 5 is an illustration of another movable tray utilizable in a composter such as that of FIG. 1.
Figure 6:
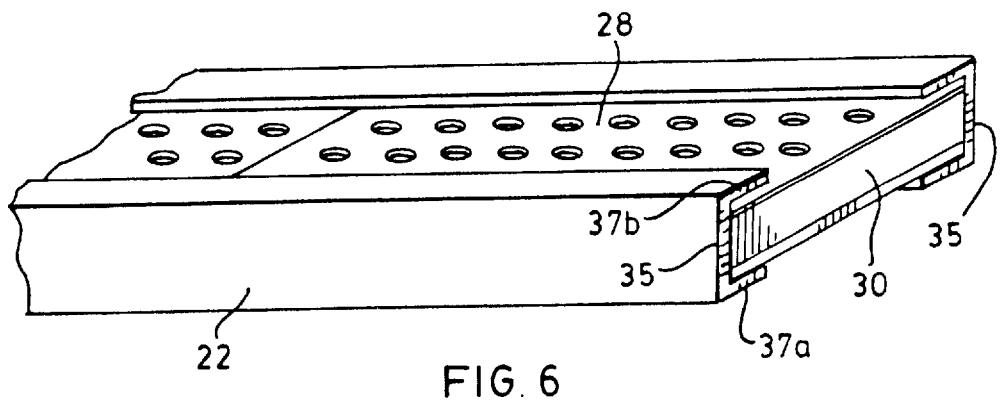
FIG. 6 is a detail showing the movable tray located in a U-channel.

As illustrated in FIGS. 1–3, the tunnel is effectively divided into two aerating zones Z1 and Z2. Three or more aerating zones are also possible. Generally operation of the two zone or three or more zone systems are similar. A temperature sensor 32 is provided in each zone Z1 and Z2.

An aeration system is provided in each zone Z1 and Z2. Each comprises a vertical duct 42 extending downwardly outside the tunnel 12 adjacent to its sidewall. The duct 42 draws air from the exterior by means of a fan 46. This air is transported down the duct to below the level of the conveyor trays 24 into a separate header 43 for each zone Z1 or Z2. From each header 43 the air is distributed through composting garbage in the respective zone. A further fan may be provided at the bottom of the duct 42. An exhaust fan 48 is provided at the top of the tunnel in each zone for the removal of the air and gases produced from each separate zone during composting. A proportion of the exhaust gases from a zone may be added through duct 45 to the aerating gas passed down duct 42 for that particular zone. It is important that recirculation is confined to any one zone to avoid distribution of bacteria throughout the whole tunnel. The exhaust gases contain an appreciable amount of unused oxygen, and it is possible that, apart from the addition of oxygen, one effect of recycling the exhaust gases is to enhance the lightening effect of the aeration and to help prevention and compaction of the garbage. Exhaust gases exiting to biofilter 36 may be passed through a final sterilizer 50, if desired.

Figure 7:
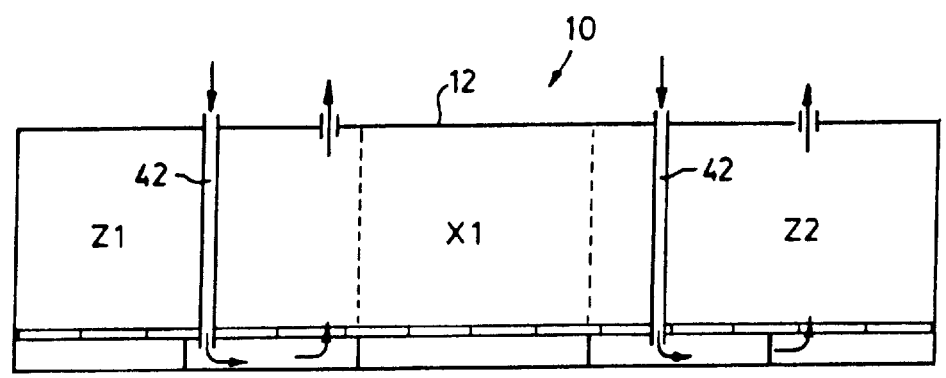
FIG. 7 shows the air flow pattern in the apparatus.
Figure 8:
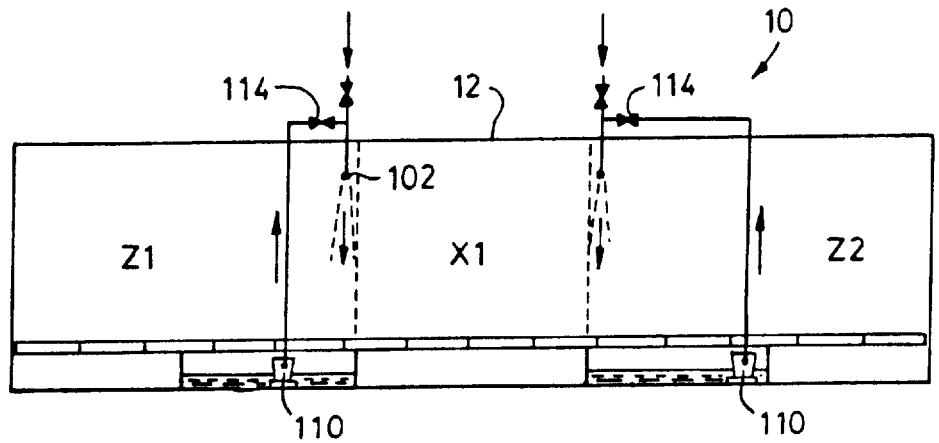
FIG. 8 shows one possible water and leachate flow pattern in the apparatus.

The location of ducts 42 and header 43 with respect to exhaust duct 48 in any one zone is such as to confine circulation to a single zone as shown in FIG. 7. Indeed, it may be convenient to separate the aerating zones Z1 and Z2 in which aeration takes place by intermediate zones such as X1 in which little or no aeration takes place. Air circulation is planned so that intermediate zone X1 is not forcibly aerated. Eventually vent gases are removed by filtering through biofilter 36. The suction exerted by exhaust fan 48 is greater than inlet pressure exerted by inlet fan 46 to tend to keep the zones Z1 and Z2 separate. The pressures may be controlled by computer 68.

It may be convenient to provide mixers 60 in the intermediate zone X1 to provide some lightening of the composting mass where there is no upward airflow.

Water is conveniently added as a water curtain from spray bar 102 extending across the tunnel 12. However, water circulation should like air circulation be confined within any one zone. Water from spray bar 102 in, for example, zone Z1 may seep through the composting garbage to be collected in a plenum chamber 104 beneath trays 24. The floor 106 of plenum chamber 104 slopes downwardly to a lower channel 108 well below the bottom of trays 24. Leachate flows downwardly into channel 108 and may be pumped away by sump pump 110. If it is desired to recirculate leachate, plenum chamber 104 and channel 104 must be divided to correspond with the zones Z1 and Z2. A sump pump 110 must be provided in each division so that there may be little chance of bacteria being transferred between zones by means of recirculating leachate. A return line 112 from each sump pump 110 is provided. The amount of any recirculated leachate is controlled by computer 68. Moreover, a nonreturn valve 114 must be provided in the line from the sump pump so that fresh water is not forced into channel 108. It is important that water be at least added immediately downstream of the mixing rollers 60 while garbage is still loose and disturbed from mixing and not compacted. Therefore the spray bar 102 downstream of mixers 60 is more important than the spray bar 102 upstream of mixers 60. In practice it is found that two spray bars 102, one spaced downstream of the other are preferred.

At the end of most downstream zone 22, augers 62 are provided one above the other to transport the formed compost into a side tunnel annex. In annex the compost delivered from the augers 62 falls onto a conveyor and is removed through sliding door 20.

The whole process may be subject to computer control by computer 68. Computer 68 calculates and controls the proportions of exhaust gas and fresh aerating gas delivered into each of the zones Z1 and Z2, in response to conditions such as temperature within the composter and may also control opening and closing of entry and exit doors. Generally, entry and exit doors are only permitted to open when garbage is entering or compost is leaving the system.

At all other times, the tunnel is effectively completely sealed. An entry port is provided for the trays 24 and an exit port is also provided; but, when trays 24 are in position within the tunnel 12, the frames effectively block and close the entry and exit ports for the trays. The computer 68 may also ensure that the pressure of aerating gas, with or without an exhaust gas component, is maintained lower than the suction pressure removing exhaust gas. If the pressure within the tunnel is maintained less than the atmospheric pressure, any leaks in the system will not result in the escape of noxious odours.

As the trays progress stepwise through the tunnel the volume of composting garbage decreases. Thus, tray 24 is loaded to within, perhaps, one foot of the roof of tunnel 12. This volume may have decreased to 40% of the original by the time the tray has reached the position of tray 24. It may be possible by use of the mixers, or by use of additional augers acting longitudinally, to provide some mixing of material from tray to tray without detriment to the composting process. Such mixing may help to move material to maintain a more even level in the tunnel. At least, additional mixing may provide greater aeration and lift and hasten composting in the downstream trays.

The longitudinal and volume dimensions of the tunnel are purely a matter of choice. It is for convenience that the system has been described with reference to a tunnel of length to accommodate fourteen trays, one tray being utilized for each day's garbage. If a regular supply of garbage is available, this system is of convenience to the operator irrespective of the amount of garbage being delivered per day. Thus, if an operator can rely on say, 200 pounds of garbage per day, the system may be designed so that each tray will accommodate 200 pounds of garbage. In such a system there is little need to check whether a tray is being overloaded and whether it is time to install a new tray. It will, however, be appreciated that when the supply of garbage is irregular there will be a need to advance the train of trays only when the tray 24 directly under the hopper 14 is filled to a suitable capacity. The decision as to when this point occurs may be made by visual inspection, or other automated means may be installed to warn the operator that a step forward of the tray train is desirable.

Again, the choice of fourteen days (or fourteen trays) as the length of the tunnel is by no means limiting. Under good conditions compost may be made in fourteen days, but given suitable strength of trays and suitable force of the ram there is no objection to compost remaining in the tunnel for a greater length of time. This will, of course, extend the length of the tunnel beyond that minimally necessary.

I claim:

1. A continuous composter comprising:
    an enclosed elongate tunnel having an upstream end and a downstream end;
    an inlet for garbage in the region of the first end;
    an outlet for compost in the second end;
    the composter comprising:
        at least an upstream composting zone in the region of the upstream end of the tunnel, and a downstream composting zone in the region of the downstream end of the tunnel;
        first means to aerate the upstream composting zone with aerating gases while containing said gases within said upstream composting zone and to recirculate a portion of venting aerating gases within said upstream zone;
        and second means to aerate the downstream composting zone with aerating gases while containing said gases within said downstream composting zone and to recirculate a portion of a venting aerating gases within said downstream zone;
    in which each of said first and second aerating means comprises:
        an air inlet to an upstream end of a header below said conveyor trays in one of the zones;
        means to pass air through said air inlet to said header;
        a gas outlet and an exhaust fan located to draw gases from said header through said one of said zones; and
        control means to maintain exhaust suction in said one of said zones stronger than inlet pressure of aerating gases in said one of said zones and in which means are provided to recycle a proportion of gases from said gas outlet to said air inlet.

2. A composter as claimed in claim 1 including at least one further composting zone having aerating means to aerate said further composting zone while containing aerating gases within said further composting zone and to recirculate a portion of venting aerating gases within said further zone.

3. A composter as claimed in claim 1 in which upstream and downstream zones may be separated by an intermediate zone without aerating means.

4. A composter as claimed in claim 1 including:
    a conveyor track raised from a floor of the tunnel and extending along the length of the tunnel;
    a train of conveyor trays to travel shuntwise on the conveyor track, each tray having a shunting frame to receive directional shunting force and each tray having a foraminous carrier surface to allow aeration of material in the tray; and
    a ram having a stroke in the direction of an elongate axis of the tunnel, the length of the stroke being equal to a chosen length of shunting step of the conveyor trays, the ram being located to act against the shunting frame of the conveyor tray which is furthest upstream.

5. A composter as claimed in claim 4 in which each conveyor tray is generally rectangular in shape, and has a width between the shunting wall and an opposed wall equal to length of the ram stroke.

6. A composter as claimed in claim 4 in which mixing means is provided in the tunnel for mixing composting garbage.

7. A composter as claimed in claim 1 in which exhaust duct means are provided to transport gases from said gas outlet to a filter.

8. A composter as claimed in claim 1 in which means are provided to add water to the garbage in an amount to promote composting.

9. A composter as claimed in claim 8 in which the means to add water is at least one water spray pipe extending across an upper region of the tunnel to spray water in a descending water curtain.

10. A composter as claimed in claim 8 in which a collector chamber for leachate is provided below said trays.

11. A composter as claimed in claim 10 in which a pump is provided to remove leachate from the collector chamber.

12. A composter as claimed in claim 10 in which a separate collector chamber is provided under the trays of each composting zone and means to recycle leachate from said collector chamber to said spray pipe.

* * * * *